(12) United States Patent
Taruno

(10) Patent No.: US 11,643,262 B2
(45) Date of Patent: May 9, 2023

(54) MULTILAYER CONTAINER AND METHOD FOR INSPECTING AIR LEAKS IN MULTILAYER CONTAINER

(71) Applicant: KYORAKU CO., LTD., Kyoto (JP)

(72) Inventor: Shinsuke Taruno, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 431 days.

(21) Appl. No.: 16/636,379

(22) PCT Filed: Aug. 16, 2018

(86) PCT No.: PCT/JP2018/030404
§ 371 (c)(1),
(2) Date: Feb. 4, 2020

(87) PCT Pub. No.: WO2019/039374
PCT Pub. Date: Feb. 28, 2019

(65) Prior Publication Data
US 2020/0172312 A1 Jun. 4, 2020

(30) Foreign Application Priority Data

Aug. 21, 2017 (JP) .............................. JP2017-158874

(51) Int. Cl.
*B65D 77/22* (2006.01)
*B65D 83/00* (2006.01)
(Continued)

(52) U.S. Cl.
CPC ......... *B65D 77/225* (2013.01); *B65D 1/0215* (2013.01); *B65D 23/02* (2013.01);
(Continued)

(58) Field of Classification Search
CPC ....................................................... F16K 15/04
(Continued)

(56) References Cited

U.S. PATENT DOCUMENTS 6,684,415 B1 2/2004 Kozono
9,995,408 B1 * 6/2018 Yager ...................... F16K 17/12
(Continued)

FOREIGN PATENT DOCUMENTS

JP 2016-104644 A 6/2016
KR 2017-0084248 A 7/2017
(Continued)

OTHER PUBLICATIONS

International Search Report dated Sep. 18, 2018 in corresponding International application No. PCT/JP2018/030404; 1 page.
(Continued)

*Primary Examiner* — Mollie Impink
(74) *Attorney, Agent, or Firm* — Maier & Maier, PLLC

(57) ABSTRACT

A delaminatable container is provided that includes a valve member allowing suppression of interference with the motion of a mobile part during use. The present invention provides a delaminatable container including an outer shell and an inner bag, the inner bag to be shrunk with a decrease in contents, wherein the outer shell includes a fresh air inlet communicating an external space with an intermediate space between the outer shell and the inner bag, the fresh air inlet has a valve member mounted thereto to regulate air communication between the intermediate space and the external space, the valve member includes a tube having a cavity provided to communicate the external space with the intermediate space and a mobile part movably stored in the cavity.

1 Claim, 13 Drawing Sheets

(51) Int. Cl.
  *B65D 1/02* (2006.01)
  *B65D 23/02* (2006.01)
  *G01M 3/04* (2006.01)
  *G01M 3/26* (2006.01)
  *G01M 3/32* (2006.01)

(52) U.S. Cl.
  CPC ........... *B65D 83/0055* (2013.01); *G01M 3/04* (2013.01); *G01M 3/26* (2013.01); *G01M 3/3218* (2013.01)

(58) Field of Classification Search
  USPC .................................................. 137/533.11
  See application file for complete search history.

(56) References Cited

U.S. PATENT DOCUMENTS

| | | |
|---|---|---|
| 2017/0313462 A1 | 11/2017 | Taruno et al. |
| 2018/0265241 A1 | 9/2018 | Taruno et al. |
| 2018/0312290 A1 | 11/2018 | Uchihashi et al. |
| 2018/0327130 A1 | 11/2018 | Taruno |
| 2018/0370673 A1 | 12/2018 | Taruno et al. |

FOREIGN PATENT DOCUMENTS

| | | | | |
|---|---|---|---|---|
| WO | 01/06065 A1 | 1/2001 | | |
| WO | WO-0106065 A1 * | 1/2001 | ............... | E03C 1/12 |
| WO | WO-03002415 A2 * | 1/2003 | ......... | B65D 47/2075 |
| WO | WO-2007020342 A1 * | 2/2007 | ......... | B65D 47/2031 |
| WO | 2016/056385 A1 | 4/2016 | | |
| WO | WO-2016121578 A1 * | 8/2016 | ............... | B32B 1/02 |
| WO | 2017/073721 A1 | 5/2017 | | |

OTHER PUBLICATIONS

Extended European Search Report dated Aug. 25, 2020, in connection with corresponding European Application No. 18847821.8; 5 pages.

* cited by examiner

FIG. 5A  A-A SECTIONAL VIEW
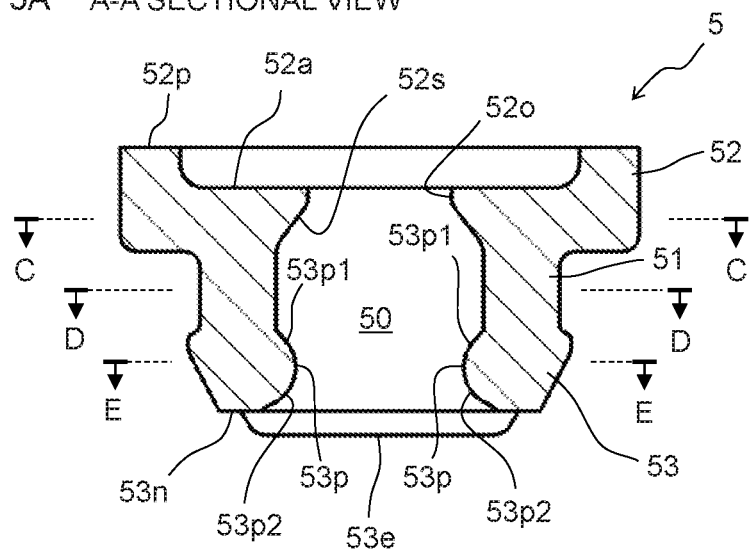
FIG. 5B  B-B SECTIONAL VIEW
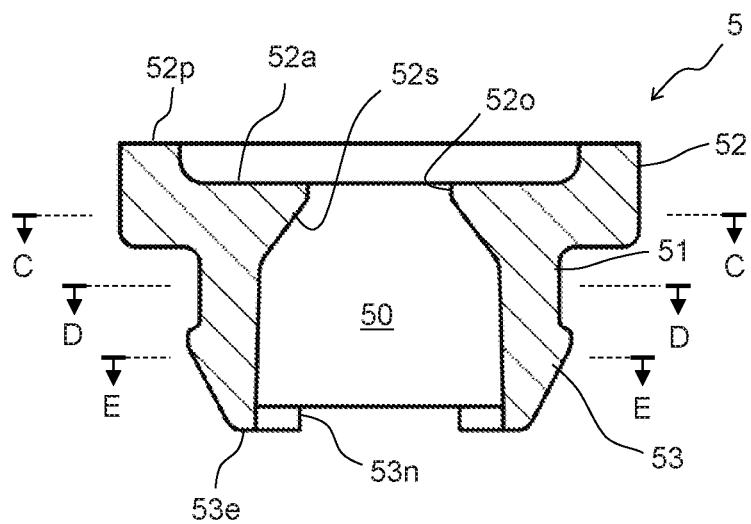

FIG. 6A   C-C SECTIONAL VIEW
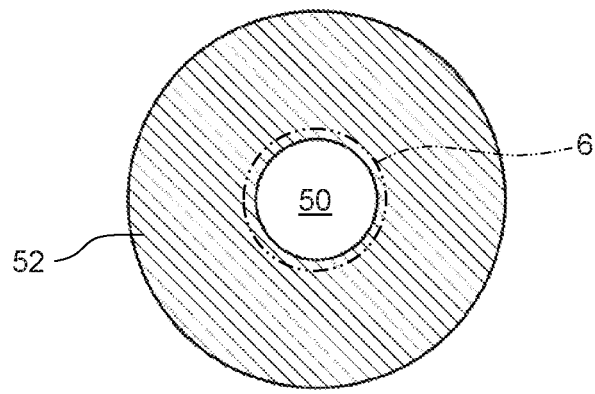
FIG. 6B   D-D SECTIONAL VIEW
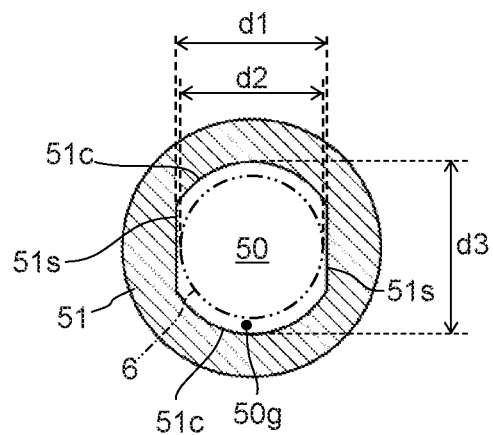
FIG. 6C   E-E SECTIONAL VIEW
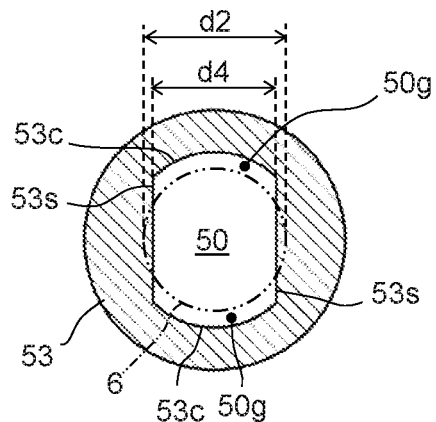

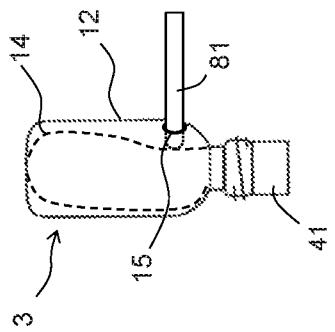
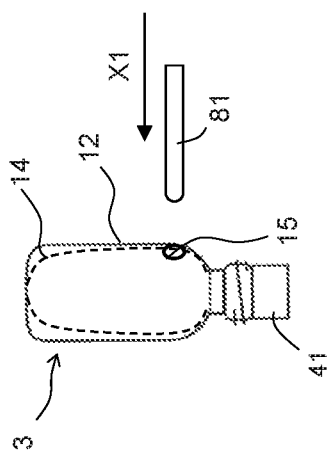
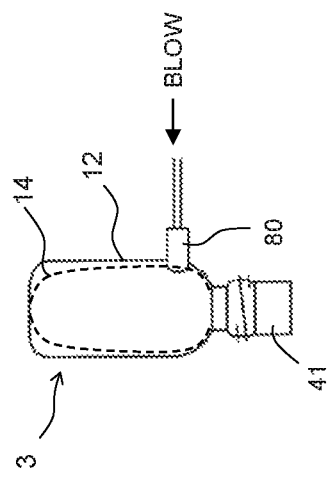

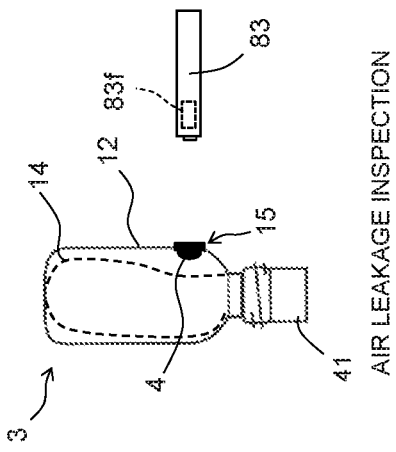
FIG. 10A VALVE MEMBER MOUNTING
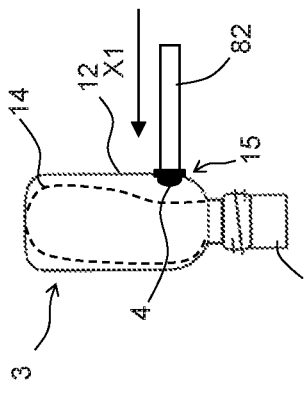
FIG. 10B VALVE MEMBER MOUNTING
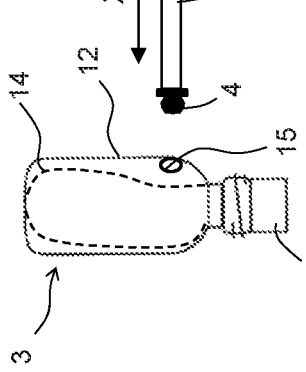
FIG. 10C AIR LEAKAGE INSPECTION
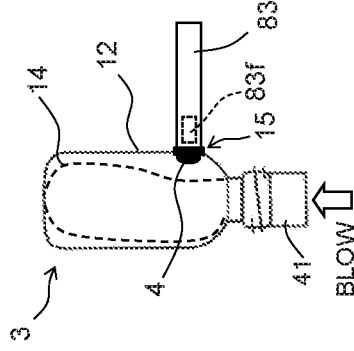
FIG. 10D AIR LEAKAGE INSPECTION
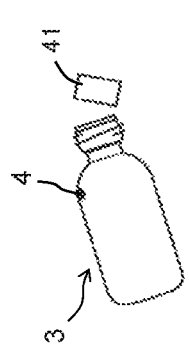
FIG. 10E CUT UPPER TUBULAR PART

MULTILAYER CONTAINER AND METHOD FOR INSPECTING AIR LEAKS IN MULTILAYER CONTAINER

TECHNICAL FIELD

The present invention relates to a delaminatable container provided with a valve member.

BACKGROUND ART

Conventionally, delaminatable containers are known that include a container body having an outer shell and an inner bag, the inner bag delaminated from the outer shell to be shrunk with a decrease in contents, and a valve member (check valve) to regulate entrance and exit of air between an external space of the container body and an intermediate space between the outer shell and the inner bag. For example, in the container in PTL 1, a valve member mounted in a fresh air inlet formed in an outer shell includes a tube having a cavity and a mobile part movable inside the tube, and the container is configured to block air communication through the cavity in movement of the mobile part towards an external space side.

CITATION LIST

Patent Literature

PTL 1: JP 2016-104644 Å

SUMMARY OF INVENTION

Technical Problem

During manufacture of a delaminatable container provided with such a valve member as in PTL 1, whether a hole (pinhole) is made in the inner bag may be checked by mounting the valve member to the outer shell, followed by blowing air into the inner bag to check whether the air leaks from the valve member. In this situation, not to allow the mobile part to block air communication through the cavity, the mobile part has to be kept on the intermediate space side against an internal pressure from the intermediate space side, and for example, it is considered to blow air into the inner bag while the mobile part is pressed from the external space side. Accordingly, from this perspective, the mobile part is preferably configured to be exposed from the tube to the external space side.

Meanwhile, when the mobile part is configured to be exposed from the tube to the external space side, a user may touch the mobile part during use of the container. Also, a shrink film, if provided outside the container, may interfere with motion of the mobile part. Accordingly, from this perspective, the mobile part is preferably not exposed from the tube.

The present invention has been made in view of such circumstances, and it is to provide a delaminatable container provided with a valve member capable of readily restricting movement of the mobile part during pinhole inspection and suppressing interference with motion of the mobile part during use.

Solution to Problem

The present invention provides a delaminatable container including an outer shell and an inner bag, the inner bag to be shrunk with a decrease in contents, wherein the outer shell includes a fresh air inlet communicating an external space with an intermediate space between the outer shell and the inner bag, the fresh air inlet has a valve member mounted thereto to regulate air communication between the intermediate space and the external space, the valve member includes a tube having a cavity provided to communicate the external space with the intermediate space and a mobile part movably stored in the cavity, the tube has a stopper to stop the mobile part in movement of the mobile part from a side of the intermediate space towards a side of the external space and to block air communication through the cavity, the tube has an outer surface on the external space side provided with an adjacent region formed adjacent to an opening on the external space side of the cavity and a protruding region protruding from the adjacent region, and the valve member is configured, with the mobile part stopped by the stopper, to locate a height position, in a direction vertical to the fresh air inlet, of an end on the external space side of the mobile part higher than a height of the adjacent region.

According to the present invention, the mobile part is configured to be located higher than the height of the adjacent region while being stopped by the stopper and it is thus possible to restrict the motion of the mobile part from the external space side in the adjacent region. Meanwhile, the tube is provided with the protruding region protruding from the adjacent region and it is thus possible to suppress interference with the motion of the mobile part during use, allowing a shrink film to be provided.

The present invention provides an air leakage inspection method for a delaminatable container having an outer shell and an inner bag, the inner bag to be shrunk with a decrease in contents, the delaminatable container including a fresh air inlet provided in the outer shell and communicating an external space with an intermediate space between the outer shell and the inner bag and a valve member to regulate air communication mounted to the fresh air inlet, the valve member including a tube having a cavity provided to communicate one side with another side and a mobile part movably stored in the cavity, the tube including a stopper to stop the mobile part in movement of the mobile part from a side of the intermediate space towards a side of the external space and to block air communication through the cavity, the tube having a surface on said another side provided with an adjacent region formed adjacent to an opening on said another side of the cavity and a protruding region formed in an exterior of the adjacent region relative to the opening, and the delaminatable container being configured, with the mobile part stopped by the stopper, to locate a height position, in a direction vertical to the fresh air inlet, of an end on the external space side of the mobile part higher than a height of the adjacent region and lower than the protruding region, the method including air leakage inspecting that measures a flow rate of air leaked from the fresh air inlet by a test probe provided with a flowmeter, wherein the air leakage inspecting is performed by positioning a movement restriction mechanism provided on the test probe in the adjacent region while restricting movement of the mobile part to the external space side.

BRIEF DESCRIPTION OF DRAWINGS

FIG. 5A is an A-A cross-sectional view of FIG. 4A and FIG. 5B is a B-B cross-sectional view of FIG. 4A.

FIG. 6A is a cross-sectional view taken along line C-C of FIGS. 5A and 5B, FIG. 6B is a cross-sectional view taken along line D-D of FIGS. 5A and 5B, and FIG. 6C is a cross-sectional view taken along line E-E of FIGS. 5A and 5B.

FIGS. 9A-9C are diagrams illustrating the procedure of manufacturing the delaminatable container 1 in FIG. 1 following FIG. 8C.

FIGS. 10A-10E are diagrams illustrating the procedure of manufacturing the delaminatable container 1 in FIG. 1 following FIG. 9C.

DESCRIPTION OF EMBODIMENTS

Embodiments of the present invention are described below. Various characteristics in the embodiments described below may be combined with each other. Each characteristic is independently inventive.

Figure 1:
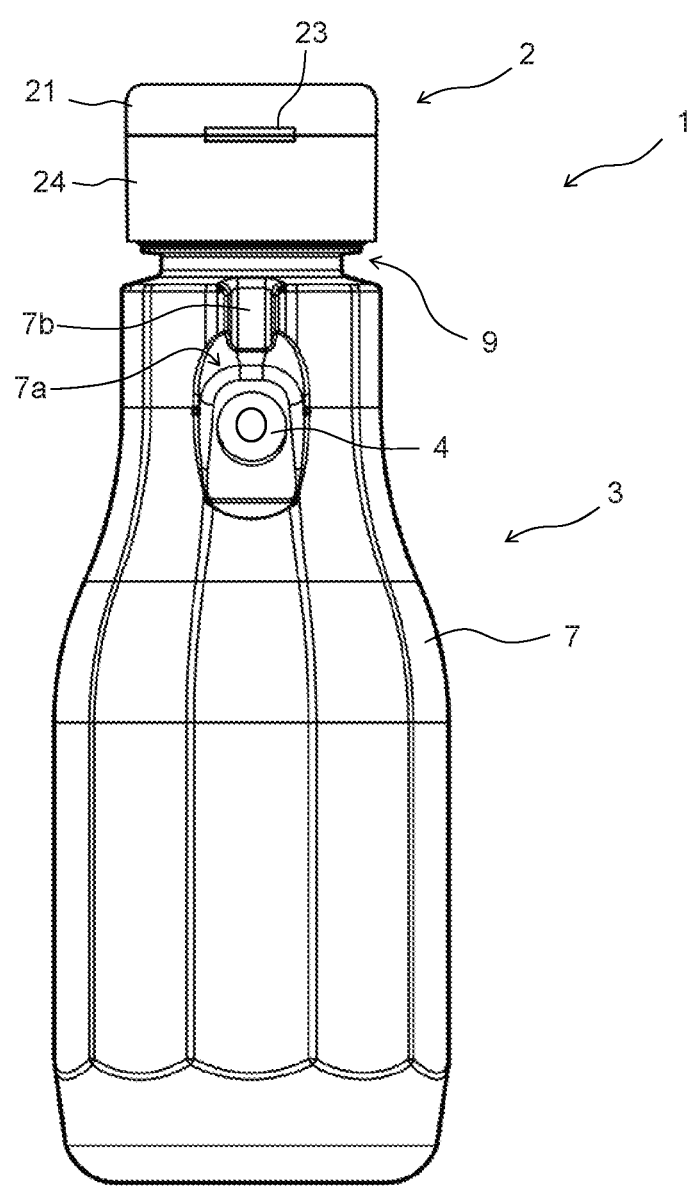
FIG. 1 is a front view of a delaminatable container 1 according to an embodiment of the present invention.

As illustrated in FIG. 1, a delaminatable container 1 in an embodiment of the present invention is provided with a cap 2 and a container body 3. The container body 3 is provided with a valve member 4, a storage portion 7 to store contents, and a mouth 9 to discharge the contents from the storage portion 7. In the present embodiment, the cap 2 is threaded while it may be mounted by press fitting.

Figure 2:
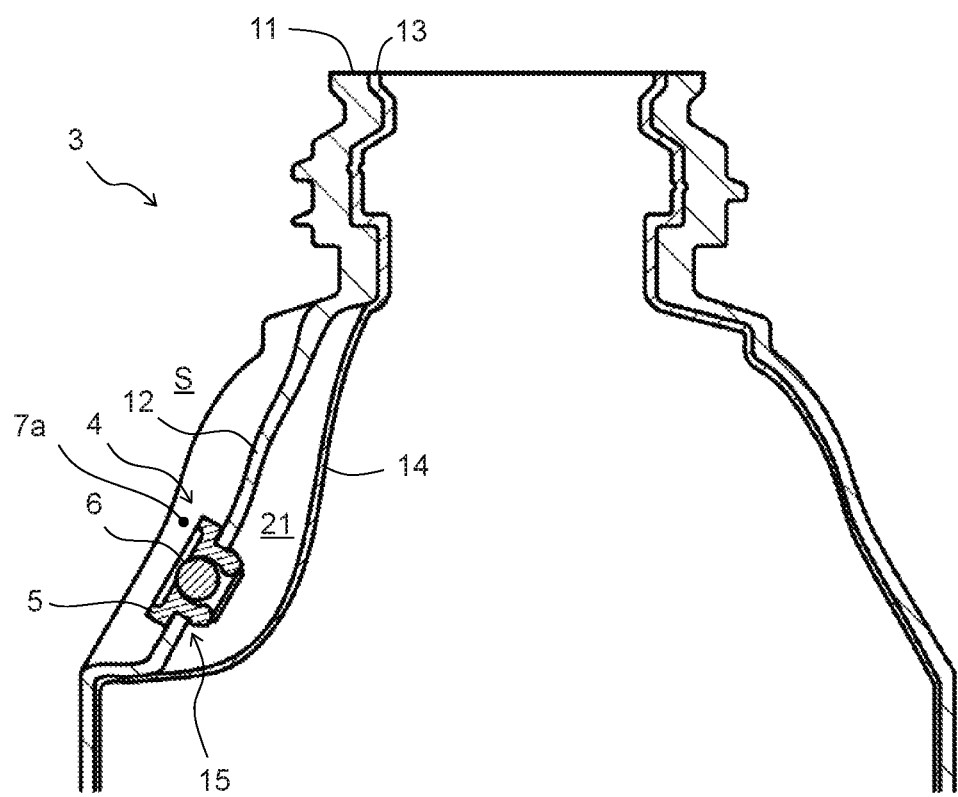
FIG. 2 is a cross-sectional view illustrating major parts, including a valve member 4, of the delaminatable container 1 in FIG. 1.

As illustrated in FIG. 2, the container body 3 is provided with an outer layer 11 and an inner layer 13 in the storage portion 7 and the mouth 9. An outer shell 12 is composed of the outer layer 11 and an inner bag 14 is composed of the inner layer 13. Due to delamination of the inner layer 13 from the outer layer 11 with a decrease in the contents, the inner bag 14 separates from the outer shell 12 to be shrunk. The container body 3 has a layer structure where the outer layer 11 is formed thicker than the inner layer 13 so as to increase the restorability thereof. The outer layer 11 is formed of, for example, low-density polyethylene, linear low-density polyethylene, high-density polyethylene, polypropylene, an ethylene-propylene copolymer, or a mixture thereof, or the like. The outer layer 11 may have a multilayer structure. The inner layer 13 is preferably composed of a plurality of layers. For example, an EVOH layer containing an ethylene-vinyl alcohol copolymer (EVOH) resin may be used as a layer to be in contact with the outer layer 11. For example, an inner surface layer containing polyolefin, such as low-density polyethylene, linear low-density polyethylene, high-density polyethylene, polypropylene, an ethylene-propylene copolymer, and a mixture thereof, may be used as a layer to be in contact with the contents. An adhesive layer is preferably used between the EVOH layer and the inner surface layer.

Figure 3A:
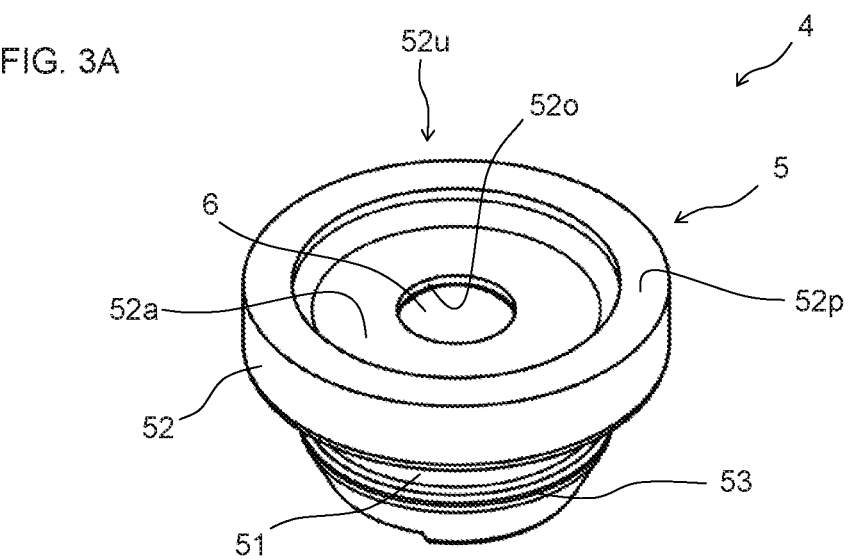
FIG. 3A is a perspective view of the valve member 4 in FIG. 2 taken from above and FIG. 3B is a perspective view of the valve member 4 taken from below.
Figure 3B:
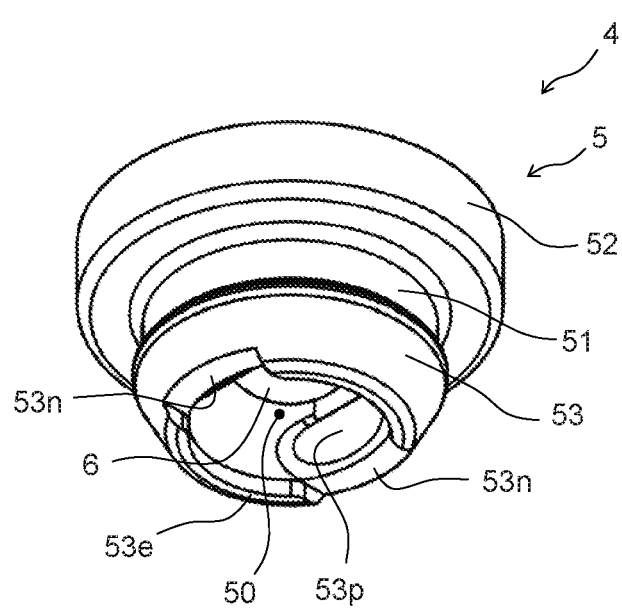

As illustrated in FIG. 2, the valve member 4 is inserted into a fresh air inlet 15 formed in the storage portion 7 to regulate entrance and exit of air between an external space S and an intermediate space 21 between the outer shell 12 and the inner bag 14. The fresh air inlet 15 is a through hole provided only in the outer shell 12 and does not reach the inner bag 14. As illustrated in FIGS. 2, 3A, and 3B, the valve member 4 is provided with a tube 5 having a cavity 50 provided to communicate the intermediate space 21 with the external space S and an approximately spherical mobile part 6 movably stored in the cavity 50. The tube 5 and the mobile part 6 are formed by injection molding or the like.

As illustrated in FIGS. 3A-5B, the tube 5 has a stem 51 with a narrow diameter arranged in the fresh air inlet 15, a disc-shaped stopping portion 52 provided on the external space S side of the stem 51 and preventing entrance of the tube 5 into the intermediate space 21, and a diametrically expanded portion 53 provided on the intermediate space 21 side of the stem 51 and preventing the tube 5 from outside the container body 3. The stopping portion 52 has an upper surface 52u (i.e., an outer surface on the external space S side of the tube 5) with an opening 52o formed to be connected with the cavity 50, and in the surroundings of the opening 52o, an adjacent region 52a is formed. The adjacent region 52a is a flat circular region to be a region to locate a protruding portion 83p of a test probe 83 during leakage inspection described later. In the exterior of the adjacent region 52a on the upper surface 52u of the stopping portion 52, an annular protruding region 52p is formed that protrudes from the adjacent region 52a to the external space S side. In this situation, the relationship between the adjacent region 52a and the protruding region 52p may be considered that the adjacent region 52a is a more recessed region than the protruding region 52p with reference to the protruding region 52p.

The cavity 50 is a hole axially (in a direction vertical to the fresh air inlet 15) penetrating the tube 5, and to store the spherical mobile part 6, has the intermediate space 21 side and the external space S side in the axial direction in a narrower shape than the center. Specifically, as illustrated in FIGS. 5A and 5B, the intermediate space 21 side of the cavity 50 has an area corresponding to the inside of the stopping portion 52. This area has a truncated cone shape with a smaller diameter towards the external space S side and is provided with a stopper 52s formed across the circumference to stop the mobile part 6 and to block air communication. Meanwhile, the intermediate space 21 side of the cavity 50 has two facing areas provided with a pair of holding portions 53p inwardly protruding in the radial direction to hold the mobile part 6 stored in the cavity 50 (refer to FIGS. 3B and 5A). In the present embodiment, the holding portions 53p have inclined surfaces 53p1 inclined towards the external space S side on which the mobile part 6 abuts to hold the mobile part 6.

As illustrated in FIGS. 6A-6C, the cavity 50 thus configured has a transverse cross-sectional shape where the cross section in a position corresponding to the stopping portion 52 (C-C cross section) has a circular shape with a gradually smaller diameter towards the external space S side. The cross section in a position corresponding to the stem 51

(D-D cross section) has a shape containing a pair of parallel plane walls 51s and two arcuate walls 51c that are formed by notching the circle in two facing areas. The cross section in a position corresponding to the diametrically expanded portion 53 (E-E cross section) has a shape containing a pair of parallel plane walls 53s and two arcuate walls 53c that are formed by notching the circle in two facing areas. In this situation, the plane walls 53s are formed by the inclined surfaces 53p1.

The holding portions 53p having the inclined surfaces 53p1 that are inclined towards the external space S side inhibit peeling of the holding portions 53p to be undercuts when a core pin to mold the cavity 50 of the tube 5 is withdrawn from the intermediate space 21 side in formation of the tube 5 by injection molding. As illustrated in FIG. 5A, the holding portions 53p also have inclined surfaces 53p2, inclined towards the intermediate space 21 side, on the intermediate space 21 side.

Figure 4A:
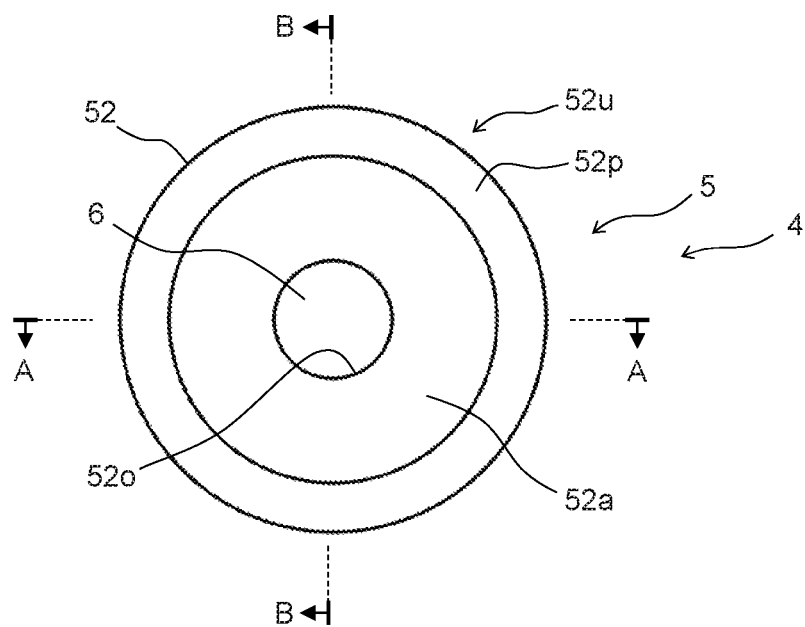
FIG. 4A is a plan view of the valve member 4 in FIG. 2
Figure 4B:
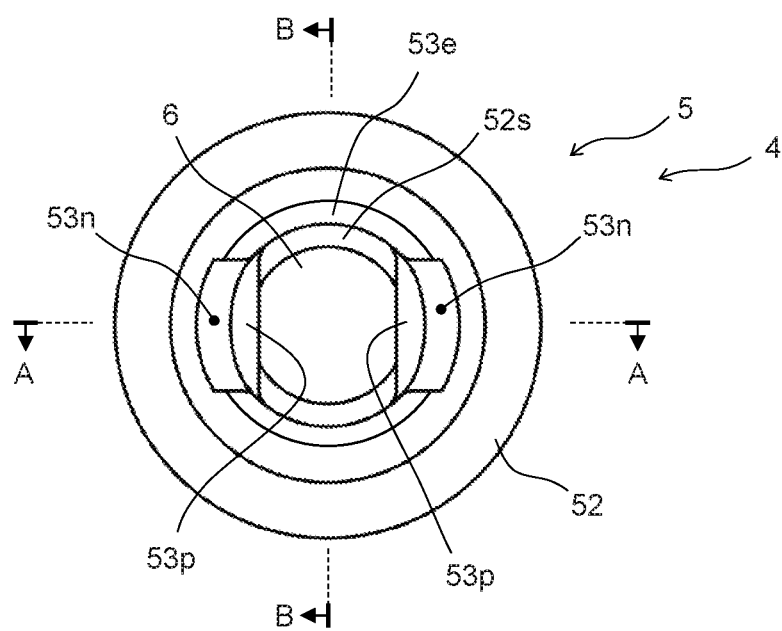
FIG. 4B is a bottom view of the valve member 4.

As illustrated in FIGS. 3B and 4B, the tube 5 has a tip end portion (an end of the diametrically expanded portion 53) provided with an annular flat surface 53e and two circumferentially facing areas provided with notches 53n formed by notching the flat surface 53e.

Figure 7A:
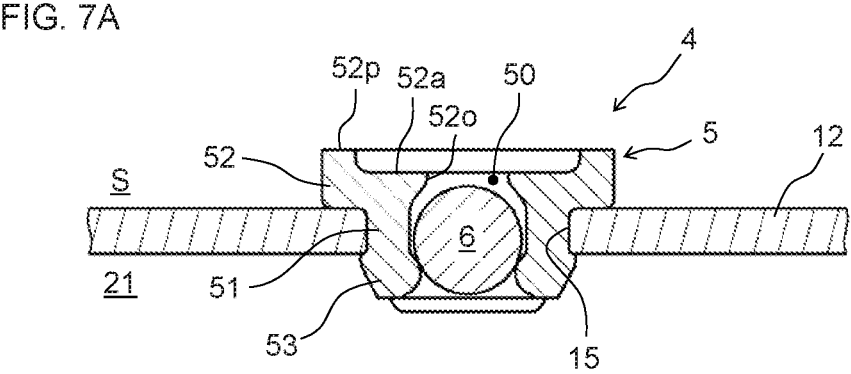
FIG. 7A is a cross-sectional view illustrating a state where the valve member 4 is mounted to an outer shell 12 and FIG. 7B is a cross-sectional view illustrating a state where a mobile part 6 abuts on a stopper 52s to close a cavity 50.

As illustrated in FIG. 7A, the mobile part 6 is introduced into the cavity 50 of the tube 5 having the shape as above from the intermediate space 21 side (diametrically expanded portion 53 side). In this situation, the tube 5 is provided with the holding portions 53p while the holding portions 53p have the inclined surfaces 53p2, and thus the mobile part 6 is allowed to be inserted into the cavity 50 over the holding portions 53p.

With the mobile part 6 stored in the cavity 50 of the tube 5, on the cross section in a position corresponding to the stem 51 (D-D cross section) as illustrated in FIG. 6B, a distance d1 between the pair of plane walls 51s is slightly greater than a diameter d2 of the mobile part 6. A value (d1/d2) of the ratio of the distance d1 between the pair of plane walls 51s to the diameter d2 of the mobile part 6 is preferably from 1.01 to 1.20. Specifically, this ratio is, for example, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, and 1.20 or it may be in a range between any two values exemplified here. In the embodiment illustrated in FIG. 6B, d1/d2=1.09 (d1=2.60 mm, d2=2.38 mm). A value (d3/d2) of the ratio of a diameter d3 of the arcuate walls 51c to the diameter d2 of the mobile part 6 is preferably from 1.02 to 1.60. Specifically, this ratio is, for example, 1.02, 1.04, 1.06, 1.08, 1.10, 1.12, 1.14, 1.16, 1.18, 1.20, 1.22, 1.24, 1.26, 1.28, 1.30, 1.32, 1.34, 1.36, 1.38, 1.40, 1.42, 1.44, 1.46, 1.48, 1.50, 1.52, 1.54, 1.56, 1.58, and 1.60 or it may be in a range between any two values exemplified here. In the embodiment illustrated in FIG. 6B, d3/d2=1.26 (d3=3.00 mm, d2=2.38 mm). The diameter d3 is preferably greater than the distance d1. Such dimensional relationship allows the mobile part 6 to move vertically (direction vertical to the axis) in the cavity 50 and also allows an air communication path to be secured in a gap 50g between the arcuate walls 51c and the mobile part 6. Meanwhile, on the cross section in a position corresponding to the diametrically expanded portion 53 (E-E cross section) as illustrated in FIG. 6C, a distance d4 between the plane walls 53s is smaller than the diameter d2 of the mobile part 6 to allow the mobile part 6 to be held. It should be noted that, in the E-E cross section as well, the gap 50g is formed between the arcuate walls 53c and the mobile part 6 to let the mobile part 6 pass through the gap 50g and not to interfere with air flow even when the mobile part 6 is held by the holding portions 53p.

As illustrated in FIG. 7A, the valve member 4 configured as above is mounted to the container body 3 by inserting the diametrically expanded portion 53 into the intermediate space 21 while pressing and expanding the fresh air inlet 15 by the diametrically expanded portion 53. When the stopping portion 52 is pressed into the position abutting on an outer surface of the outer shell 12, the valve member 4 is held by the outer shell 12 in the state where an outer circumferential surface of the stem 51 closely contacts with an edge of the fresh air inlet 15. The close contact of the outer circumferential surface of the stem 51 with the edge of the fresh air inlet 15 inhibits leakage of the air in the intermediate space 21 from a clearance between the edge of the fresh air inlet 15 and the tube 5 when the container body 3 is compressed.

The tube 5 is mounted to the container body 3 by close contact of the outer circumferential surface of the stem 51 with the edge of the fresh air inlet 15, and the diametrically expanded portion 53 is thus not essential. Since the tube 5 has a tip end provided with the flat surface 53e, the inner bag 14 is not easily damaged even when the valve member 4 is pressed into the intermediate space 21 and the tip end of the valve member 4 collides with the inner bag 14. In addition, in the present embodiment, the stopper 52s is formed inside the stopping portion 52, shifted from the stem 51 to the external space S side, and the stopper 52s is thus not deformed even when the stem 51 is pressed by the edge of the fresh air inlet 15 to allow air communication to be blocked appropriately.

When the outer shell 12 is compressed while air is in the intermediate space 21, the air in the intermediate space 21 enters into the cavity 50 from the diametrically expanded portion 53 side, and as illustrated in FIG. 空気流通溝 an air circulation groove 7b, causes the mobile part 6 to be lifted and abut on the stopper 52s. When the mobile part 6 is stopped by the stopper 52s, the air flow through the cavity 50 is blocked. When the outer shell 12 is further compressed in this state, the pressure in the intermediate space 21 is increased, and as a result, the inner bag 14 is compressed to discharge the contents in the inner bag 14.

Figure 7B:
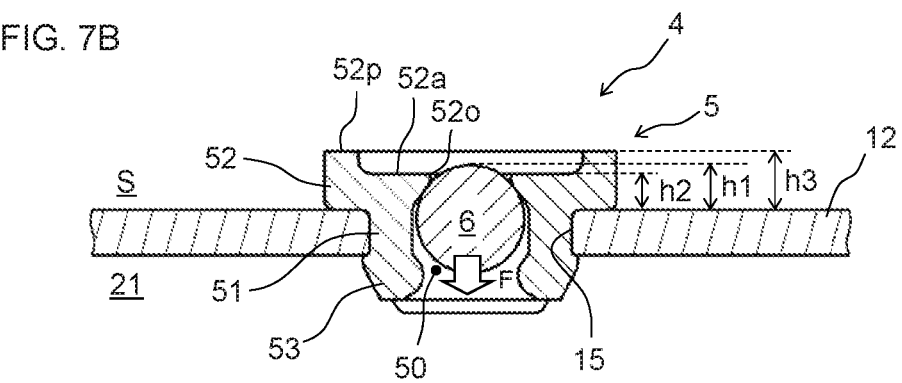

When the compressive force to the outer shell 12 is released, the outer shell 12 attempts to restore its shape by the elasticity of its own. The pressure in the intermediate space 21 is reduced with the restoration of the outer shell 12, and as illustrated in FIG. 7B, a force F in a direction inside the container is applied to the mobile part 6. This causes the mobile part 6 to move towards the bottom of the cavity 50 to the state illustrated in FIG. 7A, and fresh air is thus introduced into the intermediate space 21 through the clearance between the mobile part 6 and the walls constituting the cavity 50. In the present embodiment, since the gap 50g is formed between mobile part 6 and the arcuate walls 51c and 53c forming the cavity 50 (refer to FIGS. 6B and 6C), the cross-sectional area to take in fresh air increases particularly after discharge of the contents and the restorability of the outer shell 12 is improved.

The storage portion 7 is covered with a shrink film after the valve member 4 is mounted. At this point, to avoid interference with the shrink film by the valve member 4, the valve member 4 is mounted to a valve member mounting recess 7a provided in the storage portion 7. In addition, not to tightly close the valve member mounting recess 7a with the shrink film, an air circulation groove 7b is provided that extends in the direction from the valve member mounting recess 7a to the mouth 9 (refer to FIG. 1). Since the valve member 4 in the present embodiment is provided with the annular protruding region 52p, protruding from the adjacent region 52a to the external space S side, in the exterior of the adjacent region 52a on the upper surface 52u of the tube 5, the shrink film abuts on the protruding region 52p to prevent the shrink film to be in contact with the mobile part 6 and to interfere with the motion of the mobile part 6.

As illustrated in FIG. 7B, the valve member 4 in the present embodiment is configured, with the mobile part 6 stopped by the stopper 52s, to locate a height position h1 (in this context, with reference to the outer surface of the outer shell 12 while the tube 5 is mounted to the outer shell 12, same below), in a direction vertical to the fresh air inlet 15, of the end on the external space side of the mobile part 6 higher than a height position h2 of the adjacent region 52a of the tube 5 (h1>h2). That is to say, while the mobile part 6 is stopped by the stopper 52s, the mobile part 6 is configured to be partially out of the opening 62o. Such a configuration achieves a greater amount of movement of the mobile part 6 even when the cavity 50 is small and allows miniaturization (reduction in thickness) of the valve member 4. In addition, with the mobile part 6 stopped by the stopper 52s, the height position h1, in the direction vertical to the fresh air inlet 15, of the end on the external space side of the mobile part 6 is configured to be lower than a height position h3 of the protruding region 52p (h1<h3). Such a configuration allows effective inhibition of contact of the mobile part 6 with the shrink film.

With reference to FIGS. 8A-12C, a description is then given to an example of a method of manufacturing the delaminatable container 1 in the present embodiment.

Figure 8A:
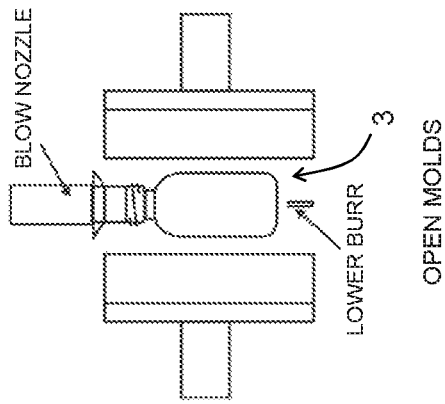
FIGS. 8A-8C are diagrams illustrating a procedure of manufacturing the delaminatable container 1 in FIG. 1.

First, as illustrated in FIG. 8A, a laminated parison in a molten state having a laminated structure (as an example, in order from the container inner surface side, a laminated structure of PE layer/adhesion layer/EVOH layer/PP layer/repro layer/PP layer) corresponding to the container body 3 to be manufactured is extruded and the laminated parison in a molten state is set in split molds by blocking air communication for blow molding and the split molds are closed.

Figure 8B:
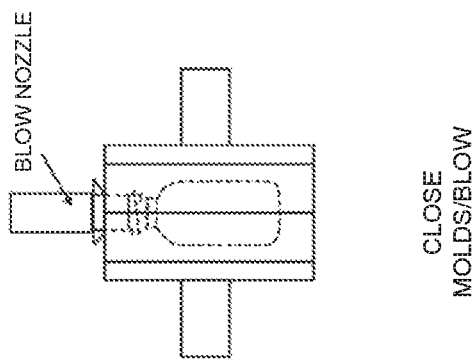

Then, as illustrated in FIG. 8B, a blow nozzle is inserted into an opening portion on the mouth 9 side of the container body 3 to blow air into the cavity of the split molds in the state of mold closure.

Figure 8C:
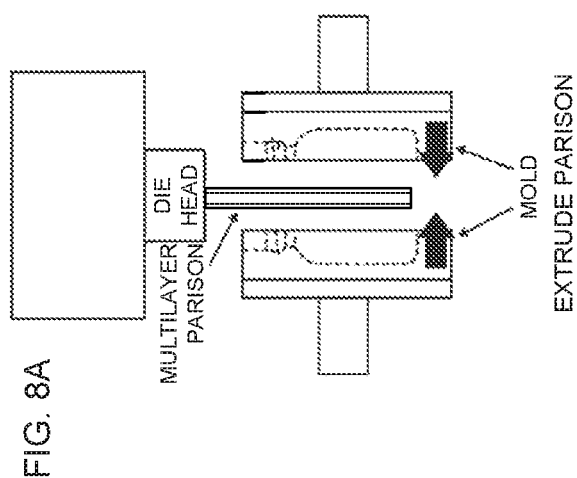

Then, as illustrated in FIG. 8C, the split molds are opened to take out the blow molded article. The split molds have a cavity shape to form the various shapes of the container body 3, such as the valve member mounting recess 7a and the air circulation groove 7b, in a blow molded article. The split molds are provided with a pinch-off in a position corresponding to the bottom of the container body 3, and lower burrs are formed in this area and they are removed. In the above procedure, the container body 3 having the outer shell 12 and the inner bag 14 is formed (container body formation procedure).

Then, using an arbitrary perforator, the fresh air inlet 15 is formed in the outer shell 12 of the container body 3 (fresh air inlet formation procedure). A detailed description on this procedure is omitted.

Then, as illustrated in FIG. 9A, a blower 80 is used to blow air between the outer shell 12 and the inner bag 14 through the fresh air inlet 15 for preliminary delamination of the inner bag 14 from the outer shell 12 (preliminary delamination procedure). In this procedure, by blowing air in a defined amount while avoiding air leakage through the fresh air inlet 15, preliminary delamination of the inner bag 14 is readily controlled. The preliminary delamination may be performed in the entire storage portion 7 or only in a partial region of the storage portion 7. Since it is not possible to check the presence of pinholes in the inner bag 14 (air leakage inspection) in the area not subjected to the preliminary delamination, the inner bag 14 is preferably preliminary delaminated from the outer shell 12 in the approximately entire storage portion 7.

After the preliminary delamination procedure, as illustrated in FIGS. 9B-9C, an insertion tool 81 is moved as illustrated in an arrow X1 direction to insert the insertion tool 42 from the fresh air inlet 15. The inner bag 14 is then pressed inside the container body 3 by the insertion tool 81 to separate the inner bag 14 from the outer shell 12 (inner bag separation procedure). This method allows large local separation of the inner bag 14 from the outer shell 12.

Then, as illustrated in FIGS. 10A-10B, a robot arm 82 is moved in the arrow X1 direction while adsorbing the valve member 4 and presses the valve member 4 into the fresh air inlet 15 to mount the valve member 4 to the outer shell 12 (valve member mounting procedure). Since the diametrically expanded portion 53 has a diameter larger than that of the fresh air inlet 15, the diametrically expanded portion 53 passes through the fresh air inlet 15 while pressing and expanding the fresh air inlet 15. Then, immediately after the diametrically expanded portion 53 passes through the fresh air inlet 15, the diametrically expanded portion 53 forcibly moves towards the inside of the container body 3. At this point, if the diametrically expanded portion 53 collides with the inner bag 14, the inner bag 14 has a risk of being damaged. In the present embodiment, the inner bag 14 is separated from the outer shell 12 in advance in the inner bag separation procedure, and the diametrically expanded portion 53 scarcely or not at all makes contact with the inner bag 14 and the inner bag 14 is not damaged.

Then, as illustrated in FIGS. 10C-10D, an air leakage test probe 83 is used to check whether there is a pinhole in the inner bag 14 for air leakage inspection (air leakage inspection procedure). The air leakage inspection procedure is described below in detail.

Figure 11A:
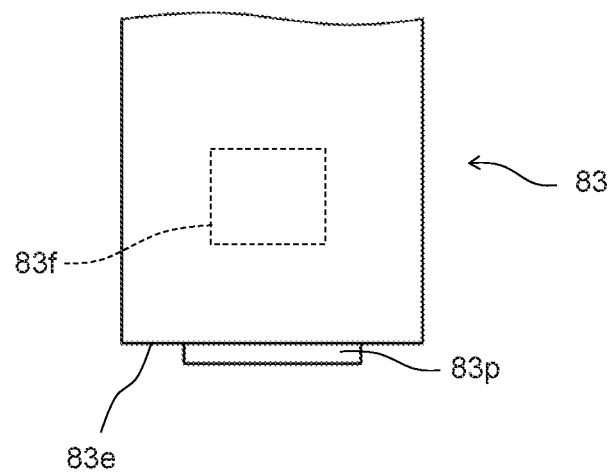
FIG. 11A is a side view of a test probe 83 used in a procedure of air leakage inspection and FIG. 11B is a front view of the test probe 83.
Figure 11B:
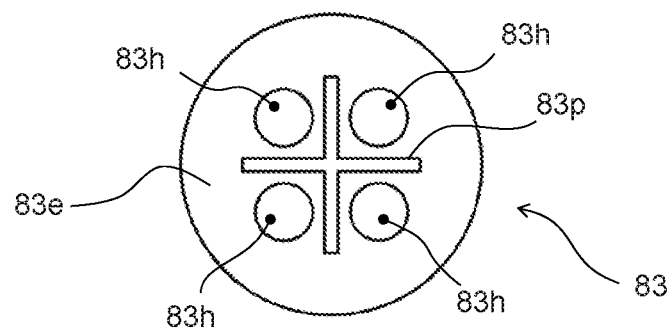

As illustrated in FIG. 11A, the test probe 83 used in the air leakage inspection procedure is provided with a flowmeter 83f therein. As illustrated in FIG. 11B, the test probe 83 has a tip end surface 83e provided with a protruding portion 83p formed in an approximately cross shape in a front view and communication holes 83h to introduce air into the test probe 83 formed in four areas displaced from the protruding portion 83p.

Figure 12A:
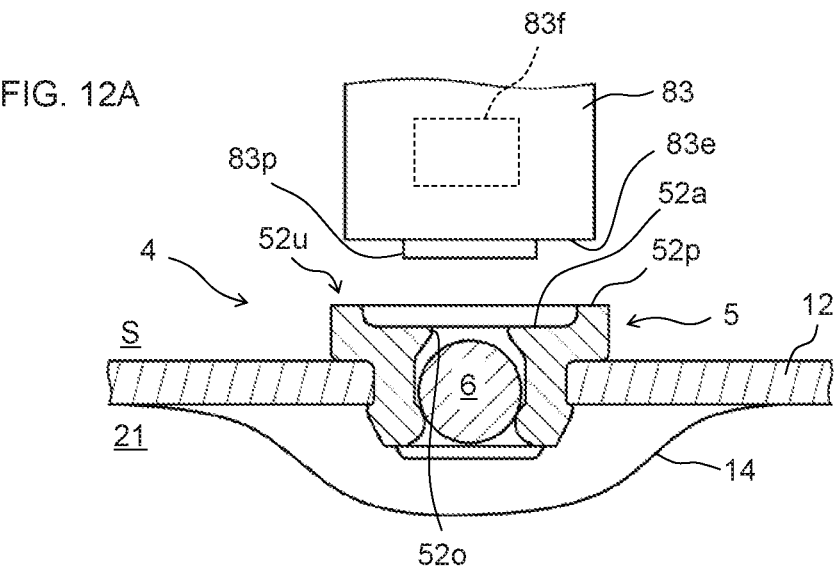
FIGS. 12A-12C are diagrams illustrating the procedure of air leakage inspection.
Figure 12B:
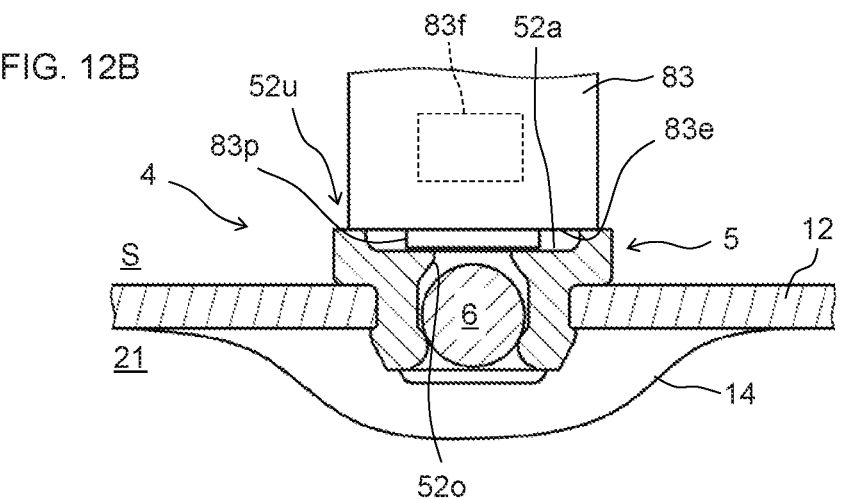

In the air leakage inspection procedure, first, as illustrated in FIGS. 12A-12B, the tip end surface 83e of the test probe 83 is abut on the upper surface 52u of the tube 5 of the valve member 4. In the present embodiment, in this situation, the tip end surface 83e of the test probe 83 abuts on the protruding region 52p of the tube 5 across the entire circumference of the protruding region 52p. When the tip end surface 83e of the test probe 83 abuts on the protruding region 52p of the tube 5, the protruding portion 83p of the test probe 83 is positioned immediately above the opening 52o (refer to FIG. 12B).

Figure 12C:
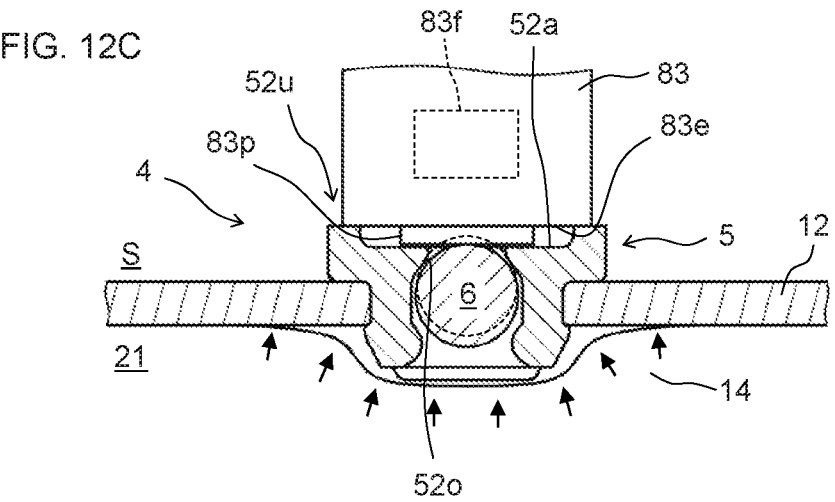

Then, as illustrated in FIG. 10D, air is blown from the mouth 9 into the container (into the inner bag 14) while the tip end surface 83e of the test probe 83 abuts on the protruding region 52p of the tube 5. Then, the internal pressure in the inner bag 14 increases, and as illustrated in FIG. 12C, the inner bag 14 and the outer shell 12 near the fresh air inlet 15 once separated due to the inner bag preliminary delamination procedure and the inner bag separation procedure are closely contact with each other again and the inner bag 14 also closely contacts with the mounted valve member 4. Since the diametrically expanded portion 53 has the end providing the flat surface 53e, the inner bag 14 is not damaged even when the inner bag 14 closely contacts with the mounted valve member 4. In addition, since the flat surface 53e is provided with the notches, even the case of close contact of the valve member 4 with the inner bag 14 does not interfere with the air flow. In this situation, if there is a pinhole in the inner bag 14, the air blown into the inner bag 14 leaks into the intermediate space 21 and the internal pressure in the intermediate space 21 also rises, causing the air flowing through the tube 5 of the valve member 4 into the communication holes 83h of the test probe 83. In this situation, since the tip end surface 83e of the test probe 83 abuts on the protruding region 52p of the tube 5 across the entire circumference of the protruding region 52p, the air does not leak into the external space S. Then, the incoming flow of the air is detected by the flowmeter 83f in the test probe 83 to allow detection of air leakage, that is, a pinhole.

If there is a pinhole in the inner bag 14 in the air leakage inspection procedure, the internal pressure in the intermediate space 21 may cause the mobile part 6 of the valve member 4 to be lifted and the mobile part 6 may be stopped by the stopper 52s to block the air flow (refer to the mobile part 6 drawn with a broken line in FIG. 12C). However, in the present embodiment as illustrated in FIG. 7B, with the mobile part 6 stopped by the stopper 52s, the height position h1, in the direction vertical to the fresh air inlet 15, of the end on the external space side of the mobile part 6 is configured to be located higher than the height position h2 of the adjacent region 52a of the tube 5, and the protruding portion 83p of the test probe 83 is positioned immediately above the opening 52o of the tube 5. The mobile part 6 in the cavity 50 is thus not capable of moving to the external space S until abutting on the stopper 52s, and the air communication is not blocked as long as the test probe 83 abuts on the valve member 4. That is to say, the protruding portion 83p of the test probe 83 in the present embodiment functions as a movement restriction mechanism to restrict the movement of the mobile part 6 to the external space S side. In addition, the cross shaped protruding portion 83p allow restrict of the movement of the mobile part 6 even if a minor error occurs in the position on which the test probe 83 abuts.

Then, as illustrated in FIG. 10E, an upper tubular portion 9a is cut, and after that, the inner bag 14 is filled with the contents, the cap 2 is mounted to the mouth 9 of the container body 3 and the storage portion 7 is covered with the shrink film to finish the product.

The order of various procedures described here may be switched appropriately. For example, the procedure of cutting the upper tubular portion 9a may be performed before inserting the valve member 4 into the fresh air inlet 15. Some of the procedures, such as the preliminary delamination procedure and the inner bag separation procedure, may be omitted.

The present invention may be carried out in the following embodiments.

Figure 13A:
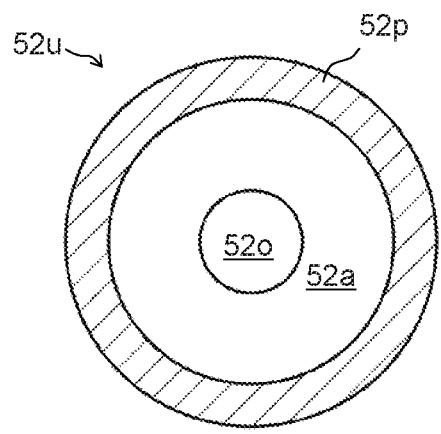
FIG. 13A is a schematic diagram illustrating an upper surface 52u of a tube 5 of the valve member 4 of the delaminatable container 1 in FIG. 1 and FIGS. 13B-13D are schematic diagrams illustrating respective upper surfaces 52u of the tubes 5 of the valve members 4 according to modifications of the present invention.
Figure 13B:
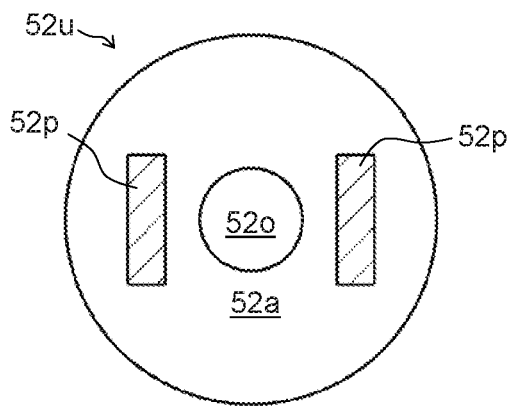
Figure 13C:
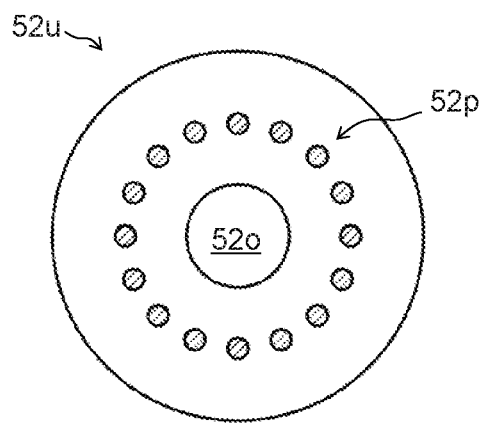
Figure 13D:
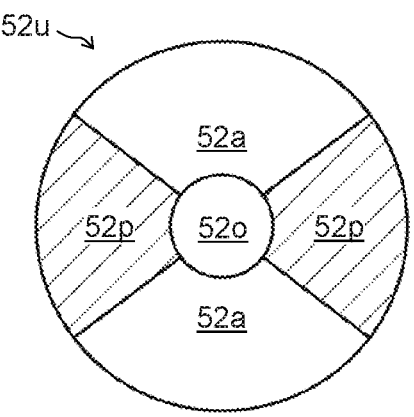

Although the upper surface 52u of the tube 5 in the above embodiment has the protruding region 52p is annularly provided across the entire circumference of the adjacent region 52a as illustrated in FIG. 13A, the shape of the protruding region 52p is not limited to this embodiment. For example, the protruding region 52p may be provided in two facing areas across the opening 52o as illustrated in FIG. 13B, many projections may be formed in the periphery of the adjacent region 52a to use them as the protruding region 52p as illustrated in FIG. 13C, or some regions circumferentially outside the opening 52o may be defined as the adjacent region 52a and the rest as the protruding region 52p. The shape of the protruding portion 83p of the test probe 83 used for the air leakage inspection procedure is preferably changed in accordance with the shape of the protruding region 52p (e.g., for FIG. 13D, the protruding portion 83p of the test probe 83 is preferably in an I shape, not the cross shape).

Although the height position h1, in the direction vertical to the fresh air inlet 15, of the end on the external space side of the mobile part 6 is configured to be higher than the height position h2 of the adjacent region 52a of the tube 5 (h1>h2) in the state where the mobile part 6 is stopped by the stopper 52s as illustrated in FIG. 7B, the mobile part 6 may be configured not to protrude from the adjacent region 52a. In this case, the protruding portion 83p of the test probe 83 used for the air leakage inspection procedure preferably has a smaller diameter than the diameter of the opening 52o of the tube 5.

Although the mobile part 6 in the above embodiment is configured to be introduced into the cavity 50 from the intermediate space 21 side, the mobile part may be configured to be introduced from the external space S side.

REFERENCE SIGNS LIST

1: Delaminatable Container, 2: Cap, 3: Container Body, 4: Valve Member, 5: Tube, 6: Mobile Part, 7: Storage Portion, 7a: Valve Member Mounting Recess, 7b: Air Circulation Groove, 9: Mouth, 9a: Upper Tubular Portion, 11: Outer Layer, 12: Outer Shell, 13: Inner Layer, 14: Inner Bag, 15: Fresh Air Inlet, 21: Intermediate Space, 50: Cavity, 50g: Gap, 51: Stem, 51c: Arcuate Wall, 51s: Plane Wall, 52: Stopping Portion, 52a: Adjacent Region, 52o: Opening, 52p: Protruding Region, 52s: Stopper, 52u: Upper Surface, 53: Diametrically Expanded Portion, 53c: Arcuate Wall, 53e: Flat Surface, 53n: Notch, 53p: Holding Portion, 53p1: Inclined Surface, 53p2: Inclined Surface, 53s: Plane Wall, 80: Blower, 81: Insertion Tool, 82: Robot Arm, 83: Air Leakage Test Probe, 83e: Tip End Surface, 83f: Flowmeter, 83h: Communication Hole, 83p: Protruding Portion, S: External Space, d1, d4: Distance, d2, d3: Diameter, h1-h3: Height Position

The invention claimed is:

1. A delaminatable container comprising:
an outer shell and an inner bag, the inner bag to be shrunk with a decrease in contents, wherein the outer shell includes a fresh air inlet communicating an external space with an intermediate space between the outer shell and the inner bag,
the fresh air inlet has a valve member mounted thereto to regulate air communication between the intermediate space and the external space,
the valve member includes a tube having a cavity provided to communicate the external space with the intermediate space and a mobile part movably stored in the cavity,
the tube has a stopper to stop the mobile part in movement of the mobile part from a side of the intermediate space towards a side of the external space and to block air communication through the cavity,
the tube has an outer surface on the external space side provided with an adjacent region formed adjacent to an opening on the external space side of the cavity and a protruding region protruding from the adjacent region,
the valve member is so configured that, in a state that the mobile part is stopped by the stopper, a height position of an end on the external space side of the mobile part is higher than a height of the adjacent region in a direction perpendicular to the fresh air inlet, the tube is integrally molded, wherein an amount of protrusion of the protruding region defined as a difference between a height of the protruding region with reference to the outer surface of the outer shell and the height of the adjacent region with reference to the outer surface of the outer shell is smaller than the height of the adjacent region, and the outer shell is covered with a shrink film, and the shrink film abuts on the protruding region to prevent the shrink film from contacting the mobile part.

* * * * *